INVENTOR.
EARL A. McLAIN

United States Patent Office 3,422,008
Patented Jan. 14, 1969

3,422,008
WOUND HOLLOW FIBER PERMEABILITY APPARATUS AND PROCESS OF MAKING THE SAME
Earl A. McLain, Walnut Creek, Calif., assignor to The Dow Chemical Company, Midland, Mich., a corporation of Delaware
Filed Oct. 24, 1963, Ser. No. 318,555
U.S. Cl. 210—22     55 Claims
Int. Cl. B01d *13/04*

ABSTRACT OF THE DISCLOSURE

This invention comprises permeability separatory apparatus and process of manufacture and use of such apparatus. In preparing this apparatus hollow fibers of a selectively permeable membrane are wound spirally around a cylindrical core through a substantial portion of the length of the core. Near at least one end of such winding, a region is impregnated with a casting resin so as to form a flange extending annularly and perpendicularly from the core. This flange is subsequently cut in a direction perpendicular to the axis of the core so as to provide open ends of the fibers extending through the flange.

---

The present invention relates to an improved and particularly efficient and effective permeability separatory apparatus. It also relates to a method of assembling such apparatus and to a process involving the use of such apparatus in selectively separating the components of multi-component fluids. More specifically, this invention relates to such apparatus comprising a plurality of hollow fibers of a selectively permeable membrane.

A diversity of membranes are known which, to various degrees, have the property of being selectively permeable to different components of fluid mixtures. Thus, some membranes will pass water while restraining ions. Other membranes will selectively pass ions in solution. Still other membranes possess selective permeation rates for two or more non-ionic components of fluid mixtures. Additional types of membranes are the so-called molecular sieve type, such as those utilized for dialysis. These can oftentimes pass ions or other materials but tend to restrain passage of high molecular weight components or are adapted to pass only certain molecular weight fractions of given materials, depending on actual molecular size and proportions thereof.

Reverse osmosis, or ultrafiltration, is one of the most practical applications of permeability separation. For example, when a solution is passed on one side of an osmotic membrane and the corresponding solvent is placed on the other side of the membrane, the solvent will pass through the membrane into the soluiton. The force causing this transfer varies with the character and concentration of the solution involved. This force is known as the specific osmotic pressure for that solution.

When a pressure differential is applied to the solution (opposed to any pressure that may be exerted on the solvent side of the membrane and in excess of the specific osmotic pressure of the system) a "reverse osmosis" or ultrafiltration is effected. In such cases, solvent from the solution is forced through the membrane while the ions are restrained from passing therethrough. When a membrane material is used that is appropriate for selective permeability of such fluids, the reverse osmosis process functions at or above the prescribed pressure for almost all fluids.

The rate of flow of liquid through a membrane can be calculated by the formula:

$$\text{Rate} = PC \times \text{Area} \times \left(\frac{\text{Pressure}}{\text{Differential}} - \frac{\text{Osmotic}}{\text{Pressure}}\right) \div \frac{\text{Membrane}}{\text{Thickness}}$$

In the above equation, PC represents the permeability constant which has a value depending on the material used in the membrane, as well as on the component to be separated. The particular membrane material is selected according to appropriateness of various factors involved. Various suitable membrane materials are hereinafter more fully disclosed.

Substantial pressures are generally required to produce reverse osmosis. For most commercial aqueous ionic solutions, at least one hundred pounds per square inch (100 p.s.i.) is required. Since the rate of mass transfer is directly related to pressure differential, the efficient range of reverse osmosis usually requires pressures of many hundreds of pounds per square inch.

Despite the inherent advantages of separation systems used in permeable membranes, there has been only a very limited adoption of such devices on a commercial scale or, for that matter, to any great extent for any purpose whatever. This has been due mainly to the relatively inefficient rate of transfer of the desired components from one side of the membrane to the other.

Contributing greatly to the inefficiency of the generally known of the presently described type of devices is the particular design of the membrane system in which the separation is effected. If flat sheets of a permeable membrane are used, they ordinarily must be supported against the forces exerted on them by the pressure differential required to effect permeation. The area of the membrane through which the desired component can flow is, accordingly, limited to those regions where fluid egress finds no intereference from the supporting structure.

Commercial use of permeability membranes has been directed primarily to thin, uniplanar membranes which are rigidly supported on grooved, perforated or porous backing members. Obviously, in such an arrangement, a membrane sheet of exceedingly large area or a plurality of such sheets are necessary in order to achieve any practical results. In such installations, "dead" areas that actually constitute portions which are unavailable for permeation result. These areas result in the spaces where the membranes are pressed against the backing plates in the apparatus. Consequently, the "free" area available for permeation is reduced in accordance with the total "dead" area required for supporting the membrane.

The use of hollow fibers of such membrane material has the advantage that the membrane supports itself against pressures applied on the inside or outside of the fiber. However, in assembling pluralities of fibers to give sufficient total membrane areas through which the flow can be conducted, various arrangements of bundles of fibers can decrease the total permeation rate by virtue of the fact that, where adjacent fibers are in contact with each other, egress or ingress of fluid is impeded. Moreover, such contact and proximity interferes with the rate of flow of fluid on the outside of the hollow fibers.

In cases where the fibers are positioned in parallel straight lines so as to be spaced from each other, such an effect reduces the capacity of a bundle of fibers by virtue of the greater space required for accommodating a set number of fibers. The relative positions of fibers to each other may shift during construction or use of the system. Thus, positioning of the fibers to attain the greatest exposure of unimpeded areas cannot be assured.

The present invention, advantageously and with utmost benefit, overcomes the deficiencies and disadvantages of heretofore known techniques and procedures in the instant field of art.

In accordance with the present invention, the maximum efficiency of hollow fiber membranes in a permeability separatory system is achieved in an arrangement of a plurality of hollow fibers wherein the fibers are wrapped upon an inner support core, preferably in spiral arrangement around this core. The ends of the fibers are preferably imbedded in a sealant which comprises a plate or tubesheet separating the region communicating with the outer areas of the fiber from the region on the opposite side of the header plate or tubesheet which is in communicating relationship with the inside of the fibers, as is hereinafter more fully described. The method of this invention for assemblying the hollow fibers in said tubesheet and the preferred process for operating the resultant separatory device are also described hereinafter.

In the accompanying drawings which are more fully referred to in the following:

Figure 1:
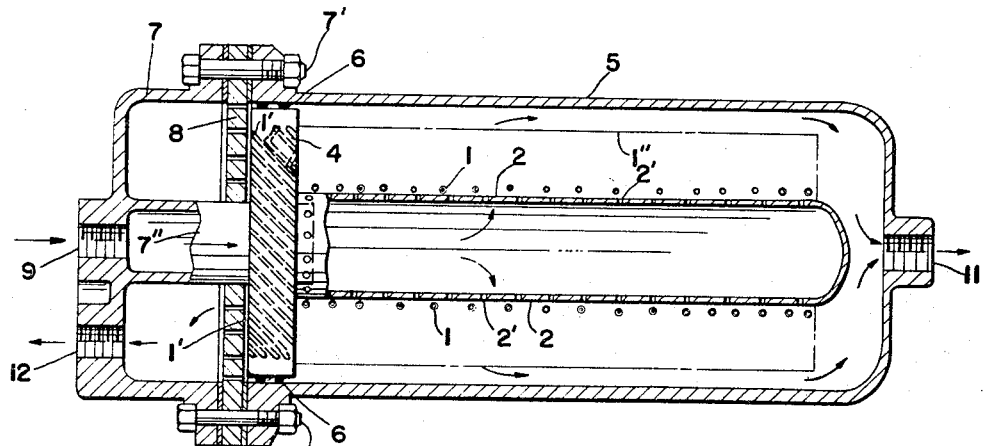
FIGURE 1 is an elevational, sectional view of the overall structure of one embodiment of a permeability cell of the present invention.
Figure 10:
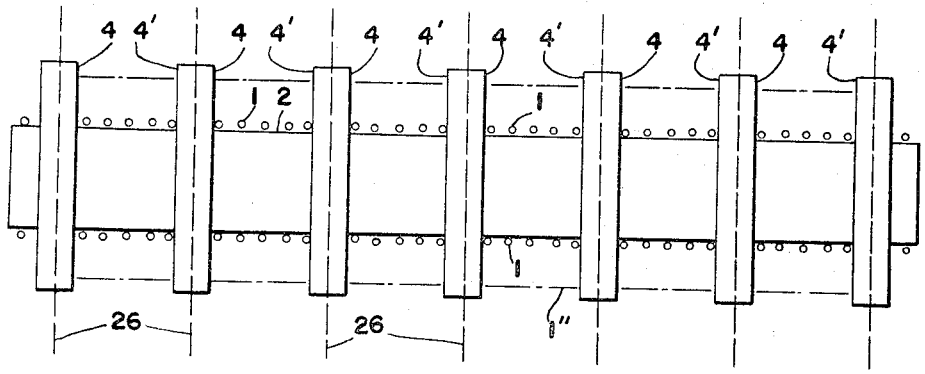
Figure 11:
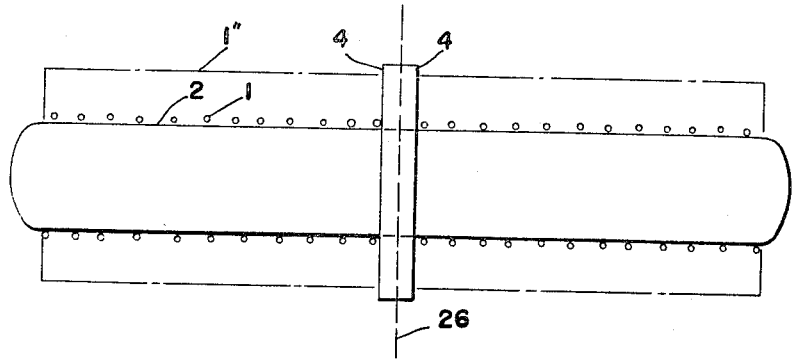

FIGURE 10 is an elevational, partially sectional view of a core of a length slightly more than six times the length of the ultimate core upon which a fiber bundle is to be used in a cell, with a plurality of tubesheets placed thereon for subsequent cutting of the tubesheets and core to produce six fiber bundles and cores of appropriate individual size; and FIGURE 11 is an elevational, partially sectional view of a fiber bundle with one tubesheet in the center, which is designed for cutting through the tubesheet and core into two fiber bundles and cores corresponding in design to that shown in FIGURE 1.

Practice of the present invention allows permeability separatory apparatus to be used most advantageously for a wide variety of separations in which great benefit is obtained from installations having exceedingly large transfer areas relative to the volume of space occupied by the apparatus. In such apparatus, very large bundles of any desired number (even up to a million or more) of the hollow fibers comprising the transfer area can be maintained in relatively small spaces. For example, these can be contained in spaces having a cross sectional width of no more than twelve inches or so.

The ratio of transfer area to apparatus volume achievable by the practice of the present invention is much greater than can be had by following prior art techniques. Thus, practice in accordance with the present invention permits installations to be employed that have surface areas for separation of materials that are as much as 10,000 sq. ft. or more per cubic foot of volume actually occupied by the installation. This represents a transfer area to apparatus volume ratio at least thirty times greater than is presently attainable in conventional apparatus for similar purposes. In contrast, present commercial and other known apparatus, depending on the type and configuration of various support needs for the membrane, generally provides only about 300 sq. ft. or less per cubic foot of installation.

Moreover, the small diameter hollow fibers used in the apparatus of this invention are able to withstand large pressure differentials in spite of their very thin walls. The different configurations of the prior art require either much thicker materials or backing plates or other types of supports to withstand like encountered pressure differentials.

A particular feature of the present invention lies in the method of assembling hollow fibers into bundles for use in the apparatus and process of the invention. The commercial application of permeability separatory apparatus using hollow fibers as a membrane structure requires the preparation of devices containing large numbers of fibers. In scaling such apparatus to commercial and/or practical sizes and applications, there are many serious problems encountered.

By way of illustration, the fibers must be produced and handled at high rates of speed in order to make efficient use of macihnery and labor. Advantageously the device is assembled from continuous filament yarns at high linear speed. Preferably, the fibers should be assembled in the device directly as they are produced by the spinning process used in the preparation of the hollow fiber. Alternately, however, the fibers may be supplied from a bobbin or textile fiber type package at a high rate of linear speed.

In the use of fiber bundles in which the fibers are assembled into large bundles of fibers that are positioned parallel to the axis of the bundle, the fluid exterior to the fibers tends to stagnate in the interior of the bundle. Moreover, with adjacent parallel fibers in contact with each other, the open spaces between fibers comprise channel enclosures running lengthwise of the fibers. These are not conductive to free flow around the surfaces of the individual fibers of the bundle. This is particularly harmful in a reverse osmosis process, wherein the solution is introduced at the outside surface of the fibers.

For that reason, it is preferable to arrange the fibers in a crisscross configuration. In such cases, the degree of openness can be varied also by changing the angle at which the fibers cross. This allows the exterior fluid to be more easily and efficiently circulated throughout the mass of fibers and also minimizes the contact area between adjacent fibers.

Moreover, with respect to the "tubesheet" which effects the seal around the exterior of each fiber end, the difficulties of effective assembly increase with increasing bundle size. Very often, it is difficult to get complete penetration of the resin or other sealant into the fiber bundle so that each fiber end is properly and effectively sealed into place. Care must be exercised in decreasing the viscosity of the resin or other sealant formulation to avoid "wicking" or creeping of the material out into the fiber bundle, thereby producing true "dead" membrane areas. Care must also be taken to avoid the resin solution entering and plugging the fiber ends.

These and other difficulties are overcome by the practice of the present invention. Furthermore, the construction of tubesheets at positions other than the end position is also made feasible. This permits the looped fiber ends to extend beyond the tubesheet so that they may be cut without disturbing the bond between fiber and the tubesheet resin. This is an important advantage with fibers which are difficult to bond. In this connection, a spiral wrapping of the fibers around a core results in the fibers extending through the tubesheet at an angle, thereby giving an increase in the bonded length to the tubesheet thickness so as to improve the seal. The particular arrangement described herein facilitates the construction of devices with mechanical support of the tubesheet for service in which the higher pressure is external to the fiber. This permits greater efficiency and economy in lower cost (or requirement) of resin or other sealant and better fiber utilization in that the resulting tubesheet can be significantly thinner.

In the use of continuous hollow fibers in the spiral wrapping operation of this invention, each reversal of direction provides a loop which upon application or impregnation of the fibers with a solution of casting resin or other sealant does not have open ends into which the resin solution can enter and thereby cause plugging. After the casting resin or other sealant has been cured or otherwise set, these loops can be cut as described herein, thereby assuring each fiber of having an open end. This has obvious advantages over the use of a plurality of fibers in which ends of the fibers are positioned near the resin—or other sealant—applying region during the formation of the tubesheet. In such cases where there are open ends of the fiber in such regions, it is difficult to avoid having the resin or sealant solution enter at least some of the open ends, thereby plugging such ends so as to decrease the efficiency of the resultant bundle for the reason that each such plugged fiber is removed from operation in the permeability separation process for which the bundles are designed.

An important feature in the particular apparatus and process of preparing the apparatus of this invention is the use of the supporting core on which the continuous hollow fibers are wound.

It is desirable to have the continuous fiber looped near or around the end of the core as the direction of the fiber is reversed. One of the advantages of this looping feature is herein emphasized in the description of the method of preparing the tubesheet where it is pointed out that such loops prevent the plugging of fiber ends with resin solution. Another advantage of the instant construction is that it is much easier to handle one continuous hollow fiber or a number of such fibers than it is to handle a number of fibers introduced individually into the bundle as disconnected lengths.

The preferred method of wrapping the fiber on the supporting core consists of revolving the core on its linear axis and then feeding one or more continuous hollow fibers so that the fiber is wound around the core as it is rotated with a guide positioning the fiber on the core as the guide traverses the length of the core, changing direction as it reaches each respective end of the core.

By adjustment of the relative speed of rotation and speed of the guide in traversing the length of the core, the pitch of the resultant spiral winding can be adjusted to any desired angle. By increasing the relative speed of the guide with respect to the rate of rotation of the core, the pitch can be increased. Vice versa, the pitch can be decreased by decreasing the relative speed. The pitch or angle of the spiral with respect to the axis of the core is, advantageously, at least 10° and, preferably, at least 30°.

Such manner of construction results in a crisscross pattern of spiral windings of the fiber on the core which gives a high degree of open space uniformly distributed throughout the fiber bundle, thus allowing excellent contact of the outer fiber surfaces with fluid flowing through the bundle.

In the aforedescribed spiral winding method, a plurality of fibers can be wound simultaneously to give a number of such spiral windings in each layer of winding. As described hereinafter, the tubesheets can be applied in various manner to obtain desired arrangement of fiber openings.

One of the chief advantages of the process of this invention is the fact that the hollow fiber can be assembled into the fiber bundle on the supporting core without any intermediate cutting into length or even storage on a bobbin or storage reel. Actually, the fiber can be assembled into the fiber bundle directly as it is produced from the spinning operation. This avoids the need for extra handling and permits assembly line production of fiber bundles and permeability cells.

In some cases, a looser arrangement is desired. Or, it may be desirable to allow for shrinkage of the hollow fiber in which case the hollow fiber would be drawn tightly against the inner core or inner winding of fiber if provision for shrinkage were not made. When this is encountered, it is desirable to supply, as a sheath over the supporting core, a layer or film of material which can be dissolved after the winding is effected. Such sheaths can be made from methyl cellulose ("Methocel"), alginates, polyglycols, gelatins or the like other materials which are soluble in water or other solvents that do not affect the hollow fiber itself. The use of such a sheath and its subsequent removal prevents the creation of any tension in the fiber which might result if the fiber has a tendency of shrink upon standing.

The invention is better described in connection with further reference to the accompanying drawings. FIGURE 1, as mentioned, shows a permeability cell according to the present invention which is particularly adapted to having the high pressure fluid external to the hollow fibers.

In this particular design, spiral wrapping of the hollow fibers 1 has been effected on the internal core 2. For the sake of clarity and simplicity, the hollow fibers are shown as a single filament. In actual practice, the wrapping is preferably constructed from a multifilament "yarn" or bundle of a plurality of hollow fibers. Only the first layer of the spiral wrapping of the hollow fibers is depicted in FIGURE 1. This winding is shown as a row of cross-sections of the fiber. The ends 1' of the fibers are shown extending through the tubesheet 4. The outline 1" shows the outer configuration of the bundle of fibers. Pressure case 5 encloses the assembled bundle including the tubesheet 4 and the cylindrical inner core 2. O-ring seals 6 effect a tight seal between the tubesheet and pressure case 5.

Channel cover 7 is fastened to pressure case 5 by bolts 7', together with backup plate 8 which holds the assembled bundle in position and has a number of openings therein to allow free flow to or from the ends of the hollow fibers extending through the tubesheet. The channel cover 7 has a high pressure inlet opening 9 communicating with the interior of inner core 2. Tubular portion 7" of channel cover 7 which extends into the interior of inner core 2 effects a tight seal against the inner portion of tubesheet 4 by means of O-ring seals or other suitable means (not shown).

Opening 11 in pressure case 5 is the high pressure outlet for fluid which has passed through the perforations 2' in inner core 2 and also through the open spaces of the bundle of hollow fibers 1. Fluid which has passed through the fiber membrane into the interior of the hollow fibers passes out fiber ends 1' collecting in the inner region of channel cover 7 and eventually passing out low pressure outlet 12.

Figure 2:
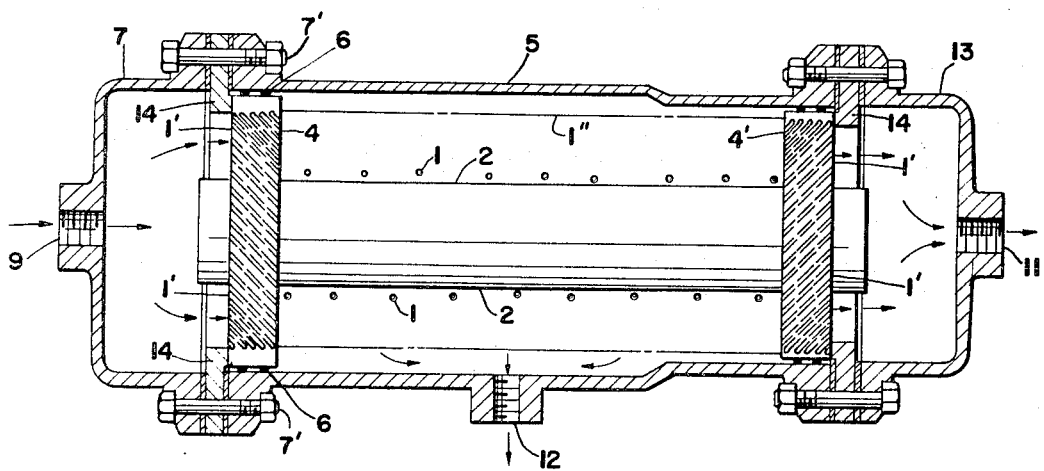
FIGURE 2 is an elevational, sectional view of another embodiment of a permeability cell of the present invention.

FIGURE 2 shows a permeable cell according to the present invention which is particularly designed to have the high pressure fluid flow through the interior of the hollow fibers 1. As is apparent, the construction involved is somewhat similar to that in the apparatus depicted in FIGURE 1, excepting that there are two tubesheets 4 and 4' with the inlet end of the fibers being imbedded in tubesheet 4 and the outlet end of the fibers being imbedded in tubesheet 4'. Also, there are two channel covers which are identified by the reference numerals 7 and 13. High pressure inlet 9 is in channel cover 7 and high pressure outlet 11 is in channel cover 13 so that the high pressure fluid entering through the inner region of channel cover 7 passes through the hollow fibers into the interior of channel cover 13 and out high pressure outlet 11. In this case, the core 2 is impermeable and sealed at both ends. In the course of travel through the hollow fibers, some of the fluid permeates the hollow fiber walls and passes through the open spaces in the fiber bundle exterior to the fibers and collects in the lower region of case 5 and eventually passes out low pressure outlet 12.

Figure 9:
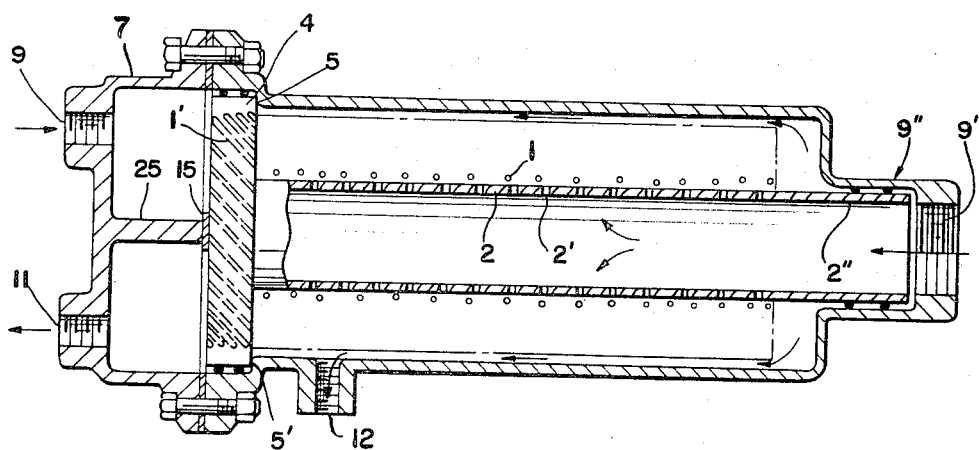
FIGURE 9 is an elevational, sectional view of a fifth embodiment of the permeability cell of this invention in which a shoulder portion of the outer casing serves as a restraining means for the tubesheet to relieve the pressure exerted thereon by the fluid being fed into the cell.

Although it is not illustrated in the drawing, the design shown in FIGURE 2 advantageously has stay-rods or a perforated cylinder around the fiber bundle and between the two tubesheets to relieve the strain on tubesheet 4 caused by the pressure of the liquid being fed through inlet 9 and against this tubesheet 4. The design of FIGURE 9 shows an equivalent restraining means designed into the outer shell. In place of the backup plate 8 shown in FIGURE 1, the apparatus of FIGURE 2 has a retainer ring 14 to hold the assembled fiber bundle in position.

Figure 3:
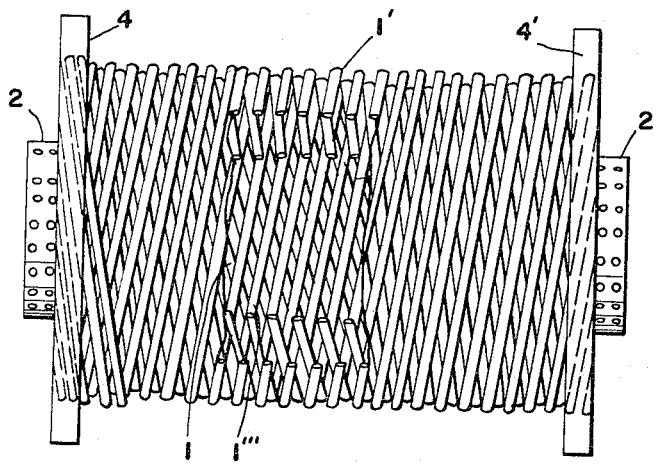
FIGURE 3 is an elevational view of a spirally-wrapped bundle of hollow fibers, wrapped on an inner cylindrical core with cut-away sections showing various layers of the spiral wrapping.

In FIGURE 3, the cut-away sections show the successive layers of spirally-wound hollow fibers with fiber 1 being the first hollow fiber winding on inner core 2 and fiber 1''' being the second layer wrapped in reverse spiral direction to the direction of fiber 1 and contacting the surface of fiber 1 only as it crisscrosses the spiral winding of fiber 1.

Figure 4:
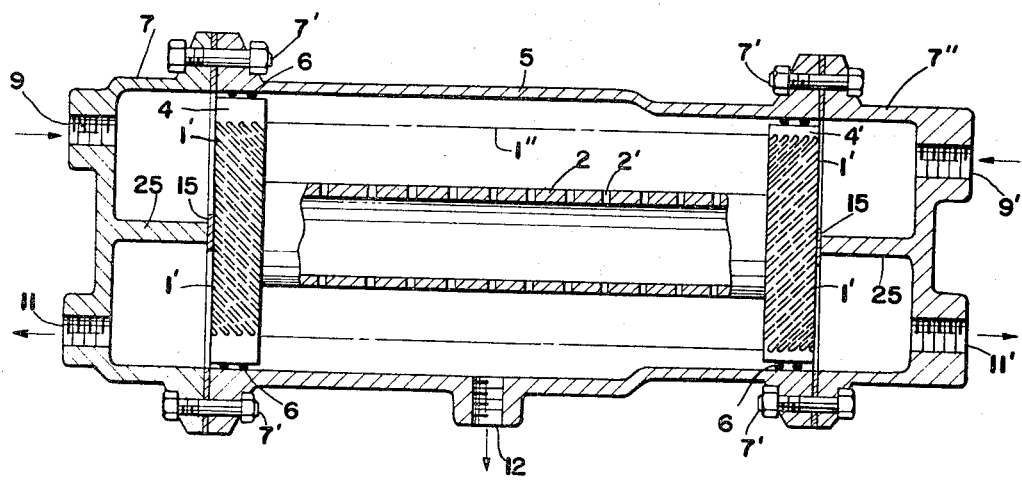
FIGURE 4 is an elevational, sectional view of a third embodiment of the permeability cell of this invention.

FIGURE 4 shows a special modification of the permeability cell of this invention in which two different or similar fluids can be used in the same hollow fiber bundle, with the resultant filtrates collecting and mixing in the region external to the fibers. In this design, the inlet end and the outlet end of each fiber is imbedded and passes through the same tubesheet. Some fibers have the inlet and outlet end in tubesheet 4 and the remainder have the inlet and outlet ends in tubesheet 4'. Those hollow fibers having the inlet end and outlet end in tubesheet 4 have an intermediate loop imbedded in tubesheet 4'. Conversely, the hollow fibers having the inlet and outlet ends in tubesheet 4' have a looped section imbedded in tubesheet 4. In this way, the hollow fibers are twice as long as they would otherwise be if the inlet and outlet ends were respectively imbedded in the opposite tubesheets.

Figure 4A:
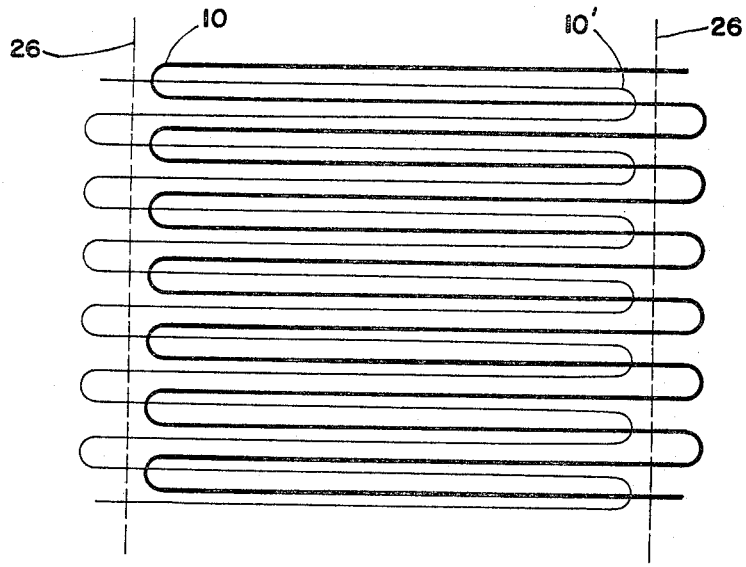
FIGURES 4a and 4b are simplified plan views of the looping of fibers in arrangements for selective cutting of fibers.
Figure 4B:
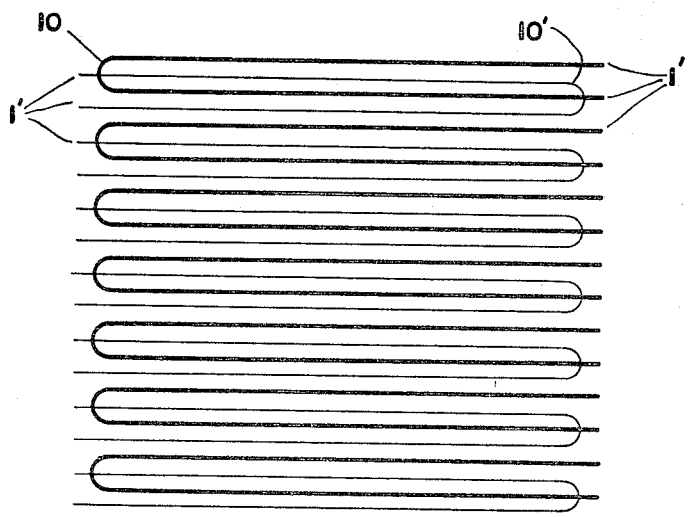

The looped portions are provided by wrapping two filaments spirally and parallel to each other with the winding reversed each time so that only the leading filament will be cut. FIGURE 4a represents (in one plane, for simplification) the relative positions of the fiber loops by so reversing the direction of the parallel windings so as to leave the leading filament in a position to be cut and the other filament in positions 10 and 10' before the cutting area is reached. This figure, of course, does not show the true spiralling configuration but is for the purpose of showing the looping arrangement for selective cutting of the fibers. By cutting on lines 26, fiber ends 1' are formed leaving loops 10 and 10' uncut as shown in FIGURE 4b. In FIGURES 4a and 4b, one filament is shown in heavy lines and the other in light lines.

The windings, shown in simplified form in FIGURES 4a and 4b, are made in such a manner that, when the fibers are cut as in FIGURE 4b, one end of a cut fiber is positioned 180° from the other end of that same fiber. This is done by having the reverse fiber winding end at a point 180° away from the point where that fiber winding was started. In this way, when the tube sheets 4 and 4' are engaged with the channel covers 7 and 7'', one fiber end will communicate with the inlet regions of the interior of these channel covers and the other end of the same fiber will communicate with the outlet region of that same channel cover, or in other words on the opposite side of dividing partition 25.

Figure 7:
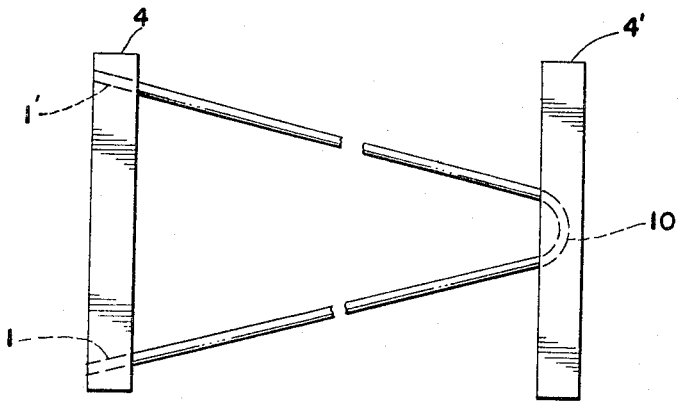
FIGURE 7 shows a sectional view of a portion of the cell of FIGURE 4 illustrating the manner of embedding an intermediate fiber loop in the tubesheet.

FIGURE 7 shows a simplified sketch of the manner in which an intermediate loop 10 is imbedded in tubesheet 4' with inlet and outlet ends 1' being imbedded in tubesheet 4. Although not shown in this view, another set of fiber ends 1' are also imbedded in tubesheet 4' with the corresponding intermediate loop being imbedded in tubesheet 4. In this view the true spiralling configuration is not shown and a more direct path of the fiber from tubesheet 4 to tubesheet 4' is shown for the purpose of illustrating the relative positioning of the imbedded fiber ends 1' and intermediate loop 10.

With the device shown in FIGURE 4, either the same fluid feed or different fluid feed can be fed into inlets 9 and 9' and the outflow from the respective fibers will be to the lower region of the same interior region of the respective channel covers and out outlets 11 and 11'. The partition dividing channel cover 25 separates the inlet region from the outlet region in the interior of channel cover 7 and the partition dividing channel cover 10 separates the inlet region and outlet region of channel cover 7''. Gaskets 15 provide tight seals between the various inlet and outlet regions. The fluid which has permeated the hollow fiber membranes flows out through low pressure outlet 12.

Of course, the device of FIGURE 4 can be operated with the feed flowing around the outside of the fibers. The filtrates then pass through to the inside of the fibers and exit via the channel cover outlets.

Figure 5:
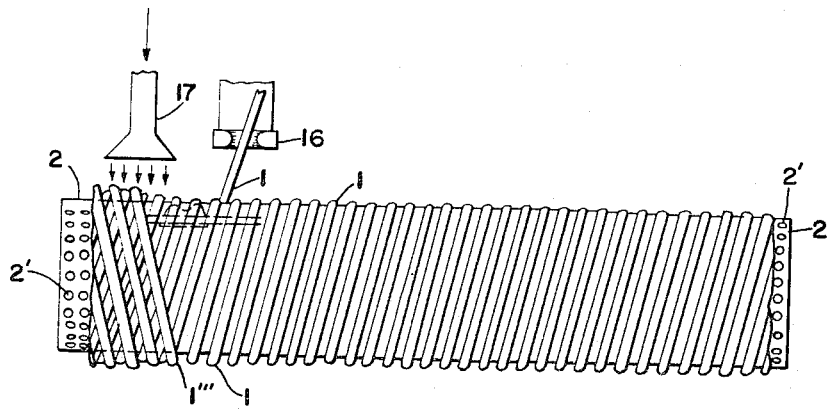
FIGURE 5 is a front elevational view of a bundle of spirally-wrapped hollow fibers wrapped on an inner core and shown during the course of the wrapping operation.

FIGURE 5 shows an arrangement of equipment used in the wrapping of the fiber to make the assembled fiber bundle in accordance with the invention. As cylindrical inner core 2 is rotated on its axis (by a rotating means not shown), a continuous filament, hollow fiber 1, is fed under controlled tension to yarn guide 16, which moves in a reciprocating motion in a path parallel to the axis of the inner core so as to ply the fiber in a spiral path in a plurality of windings around the inner core. The ratio of speed of rotation of the inner core to the cycle time for the reciprocating motion of the yarn guide 16 determines the angle at which the individual fibers cross each other. As the cylindrical core 2 rotates on its axis and the hollow fibers are being wound upon it, a solution of resinous material is applied over the fibers by spray applicator 17. The quantity of resin applied is metered so as to build up the tubesheet (not shown). The fiber windings extend to the left and beyond tubesheet 4 to provide ends that can be cut as indicated and discussed with reference to the other figures to provide the open ends through which fluid can be passed into or out of the spirally wound fibers.

Figure 6:
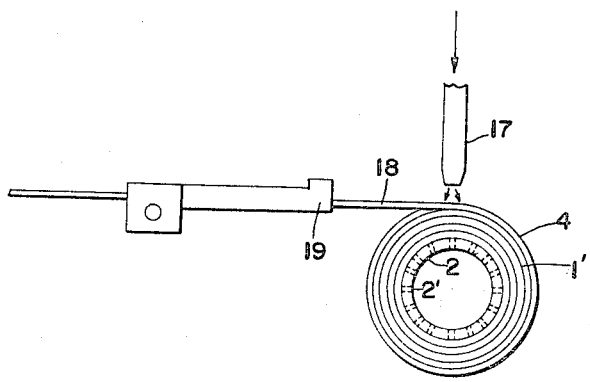
FIGURE 6 shows an elevational end view of the hollow fiber bundle of FIGURE 5 during the wrapping operation.

FIGURE 6 illustrates apparatus utilized for the winding of a strip of reinforcing fabric 18 around the tubesheet 4 while resin is being simultaneously applied by way of resin applicator 17. The reinforcing fabric winding, which serves to build up a flange on the tubesheet 4, is applied after the bundle of fibers is formed to outer configuration 1''. The reinforcing fabric is cut by knife 19 to the proper size after the desired flange width is obtained. The assembled bundle is then removed from the apparatus and generally stored on a rack until the tubesheet resin has cured. Then the assembly is placed in a lathe machine wherein the grooves for the O rings 6 are machined. As noted above, the fiber windings extend beyond the outer face of the tubesheet 4. This is to permit the fiber ends to be severed without disturbing the resin bond at the face of the tubesheet and to thereby facilitate maintenance of a tight pressure seal against the fiber outer surfaces. The flat face of tubesheet 4 through which the fiber ends 1' extend can also be machined to provide a smooth exterior surface or to cut off extruding portions of the fiber ends.

Figure 8:
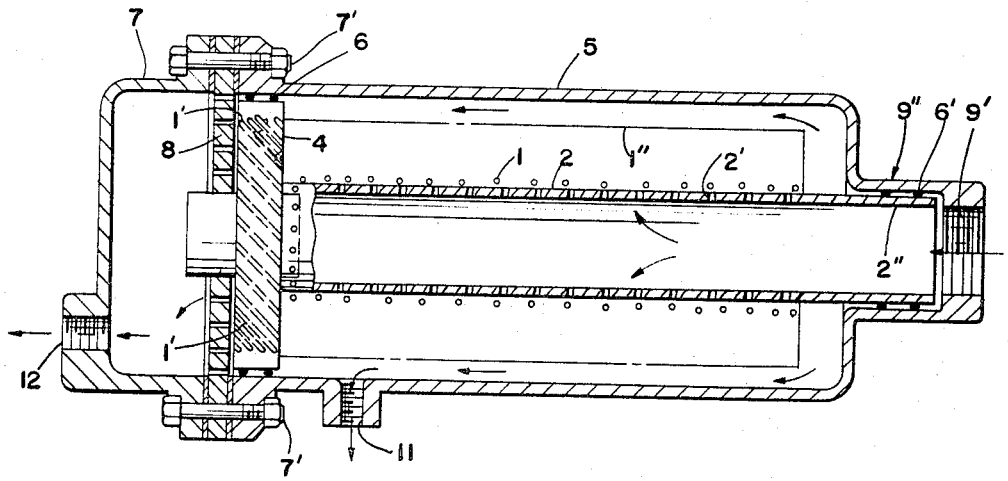
FIGURE 8 is an elevational sectional view of a fourth embodiment of the cell of this invention which features a receptacle portion in the fluid inlet section for receiving one end of the inner core.

FIGURE 8 shows a modification of the permeable cell of this invention in which a non-perforated end section 2'' of the inner supporting core 2 extends into and is received in a receiving portion 9'' of inlet 9'. In this design, both the inlet end and outlet end of each fiber are insulated by the same tubesheet 4 against the pressure exerted against the tubesheet by the fluid introduced into and passing through the cell. Tubesheet 4 is supported by backup plate 8. The space between the extended portion 2″ of core 2 and the receptacle 9″ is sealed by O rings so that the fluid is required to pass through the inner region of core 2. In this instance, the fluid enters through opening 9 into the interior of inner supporting core 2 and out through the perforations 2″ whereby it comes into contact with the outer surfaces of the fibers 1 in the fiber bundle and eventually passes out from pressure case 5 through outlet opening 11. Fluid exits through a low pressure outlet 12 when it has permeated through the walls of the fibers and passed through the open ends of the fibers into and through the perforations in the backup plate and into the inner region of channel cover 7.

FIGURE 9 shows a modification of the cell of this invention in which shoulder 5′ of outer casing 5 is designed to receive and restrain tubesheet 4 against movement due to pressure of the fluid introduced through inlet 9 for delivery into open ends 1′ of the hollow fibers.

In the design of FIGURE 9, the receiving portion of receptacle 9″ is shown in let 9′ for receiving the non-perforated extended end section 2″ of inner core 2. In this design fluid is delivered through inlet 9 to the inner region of channel cover 7. The fluid is introduced to the fibers through inlet ends 1′ extending through tubesheet 4, and then passes through the fibers wrapped around the inner supporting core 2 and out through fiber outlet ends 1′ into the lower section of the inner region of channel cover 7 and finally exits through outlet 11. The upper and lower regions of the interior of channel 7 are separated from each other by dividing section 25 to prevent direct flow from the upper to the lower region of the channel. Gasket 15 provides a tight seal between the inlet and outlet regions of the interior of channel cover 7. Fluid which permeates through the fiber walls collects in the lower region of the interior of outer casing 5 and then passes out through outlet 12. Inlet 9′ is provided in instances when it is desirable to pass a fluid through the fiber bundle either for dialysis or to sweep away fluid which has permeated through the fiber walls. In dialysis no pressure differential is required, although pressure can sometimes be advantageously applied. If it is not desirable or necessary to treat or utilize such a fluid, opening 9′ can be omitted entirely or it can be plugged.

This particular design of FIGURE 9 has the advantage of supporting the tubesheet against the pressure of the fluid being introduced into the fiber by means of the shoulder 5′ of outer casing 5. This design also has the advantage that only one tubesheet is required.

FIGURE 10 illustrates a design in which a large number of the fiber bundle, core and tubesheet assemblies can be made at one time following the precepts of the present invention. According to this modification, an extremely long core 2 is spirally wound with hollow fiber which in this case is shown in cross section as 1 and the outer winding of the fiber bundle is represented by the broken line 1″. An appropriate number of tubesheets, and at least three, are equally spaced appropriate distances from each other upon the fiber bundle. Then the tubesheets and cores are cut at dotted lines 26. This procedure provides a number of individual fiber bundle-core-tubesheet assemblies. The resultant assemblies each have tubesheets 4 and 4′ with open fiber ends extending therethrough.

FIGURE 11 shows a modification of the invention similar to that of FIGURE 10 except that there is only one tubesheet placed thereon and the core length is only slightly more than twice that of the desired ultimate individual core. Upon cutting of the tubesheet and core through dotted line 26, a fiber bundle assembly similar to that shown in FIGURE 1 is produced.

While the method of preparing the inner-core supported fiber bundle is preferred wherein the fiber is wrapped directly on the inner supporting core, it is also possible to prepare the fiber bundle by wrapping the fibers by various means leaving free the space which is subsequently to be occupied by the inner supporting core and then insert the inner core prior to the final assembly and use of the bundle. For example, it is possible to lay the continuous fiber in a cylindrical container having an inner surface corresponding in size and shape to the outside of the desired fiber bundle. A space concentric with the axis of this container and corresponding in size to the size of the inner supporting core which is to be inserted, is left free. By having this container in an upright position, e.g. with the linear axis in a vertical position, the fiber can be laid in the container to a height which will correspond to the desired length of the fiber bundle. The fiber is laid in a substantially spiral path with the axis of the container as its center. This spiral plying of the fiber can be accomplished with a centrifugal force to throw the fiber against the inner surface of the container.

After the fiber has been wrapped around the inner supporting core, either by having the core positioned during the aforedescribed winding operation, or inserted in the free space left after the fiber has been positioned in the container, the remainder of the assembly steps can be performed as in the various other modifications.

In order to facilitate the insertion of the core into the axial free space, it is advantageous if the core is first lubricated or contracted by chilling so as to fit easily into the interior of the fiber bundle. The outer casing container may be retained or removed from the fiber bundle. If it is to be retained, it may be desirable in some instances to have the container wall perforated to allow for free flow therethru.

The invention is further illustrated in and by the following examples which are given merely as illustration and are not intended to restrict in any way the scope of the invention nor the manner in which it can be practiced. In these examples and throughout the specification, unless specifically provided otherwise, reference to parts and percentages means parts by weight and percentages by weight respectively.

EXAMPLE I

Fine hollow fibers of cellulose triacetate are produced by a wet spinning process in which the cellulose triacetate is first dissolved in a 2:1 methylene chloride/formic acid solution to form a viscous spinning solution. The spinning solution is extruded into a coagulant bath of 95 percent ethanol through a small annular orifice to which simultaneously is center-fed, as a core liquid, water at a rate of 1 volume of water per 6 volumes of spinning solution. The extruded fiber coagulates or gels in the desired form of a continuously hollow tube having a wall of uniform thickness. The fiber is washed free of solvent in a water bath and taken up on a storage reel or if desired used directly in the winding operation of this invention.

EXAMPLE II

Molten cellulose triacetate is extruded through an annular orifice to form a continuous hollow fiber. This fiber is taken up on reels of 300 meters capacity each.

EXAMPLE III

A hollow brass tube is provided having one end closed, having a length of 7¼ inches, an outside diameter of ½ inch, a wall thickness of 1/16 inch, having holes or perforation of 1/32 inch diameter in the wall of the tube, six holes being spaced radially around the tube and each set of such holes being spaced ¼ inch along the length of the tube. Near the closed end of the core, the outer cylindrical surface of the core is coated with a primer for an area extending approximately one inch from the end of the core. This primer consists of 10.0 parts of the diglycidyl ether of bisphenol, 2.7 parts of (N-2-phenyl-2-hydroxyethyl)-diethylene triamine and 7.3 parts of acetone.

A length of a hollow fiber made according to Example I and having an outer diameter of about 190 microns, a wall thickness of about 31.5 microns and an inner diameter of about 127 microns is spirally wound on the core while the core is supported and rotated on its linear axis. The fiber is fed to the core by a reciprocating arm which reverses its path as the winding reaches one or the other end of the core. For each sweep of the fiber winding on the length of the core, the core is rotated 4.5 revolutions. In this manner a length of about 198 meters of the fiber is spirally wrapped on the core to give a fiber bundle having an outside diameter of approximately 1 inch.

An outer shell made of Monel metal having the configuration shown in FIGURE 8 with a length of 8 inches and an inside diameter of 1⅜ inches, and a wall thickness of ⅛ inch is primed (with the formulation described above) on the inner cylindrical surface for an area extending one inch into the open end of the shell. Advantageously, the priming of the shell is accomplished at the same time the core is primed as described above. After the primer has set sufficiently, the core with the fiber bundle thereon is inserted into the outer shell and the "tubesheet" is cast with epoxy resin. The tubesheet is formed by first standing the outer shell containing the core together with the wrapped fiber bundle in a pan having a depth of about ½ inch of the epoxy resin solution therein until the resin hardens. Then the resin outside the shell is broken away and the resultant integral tubesheet is allowed to cure by standing about 16 hours at room temperature. The epoxy resin solution used for this purpose consists of 14.7 parts of the diglycidyl ether of bisphenol, 6.8 parts of soya-1,3-propylene diamine and 1.1 parts of dimethylaminopropylamine.

After the tubesheet is cured, epoxy resin is machined off the outside flat surface of the tubesheet to expose open ends of the hollow fiber. Based on the extent of resin coverage of the fiber at the end of the bundle, it is estimated that 80 percent of the initial length of the fiber in the bundle still remains uncoated and is available for permeation.

A perforated plate and channel cover shown as 8 and 7 respectively in FIGURE 8 are then attached to the outer shell now containing the integrally sealed supporting core and the fiber bundle which has open ends of the fibers extending through the cast tubesheet.

EXAMPLE IV

The permeability cell of Example III is tested with a feed solution of 0.5 percent NaCl at room temperature. This solution is fed at a pressure of 400 p.s.i. through inlet 9 as described with reference to FIGURE 8 into the inside of perforated core 2. The feed solution then flows to and through the perforations and into intimate contact with the fibers in the fiber bundle. Then after passing out of the fiber bundle, the main portion of the solution flows out through outlet 11. That part of the liquid which permeates the fibers flows out the open fiber ends 1' through the perforations in retainer plate 8, into the open space of channel cover 7 and out through outlet 12. The feed solution is fed at a flow rate of 53 cubic centimeters per hour and has a permeation rate through to the inside of the fibers of 3.1 cubic centimeters per hour. The permeate has a NaCl content of 0.023 percent, which calculates to a salt rejection of approximately 96 percent by use of the equation:

Salt rejection=
$$\frac{\text{feed concentration} - \text{permeate concentration}}{\text{feed concentration}} \times 100$$

EXAMPLE V

The procedure of Example IV is repeated a number of times with excellent separatory results using sea water, and 0.5 percent aqueous solutions of KCl, KBr, $Na_2SO_4$, $Na_3PO_4$, $CaCl_2$, NaOH, $H_3PO_4$, monosodium glutamate and sodium chromate respectively. Excellent results are also obtained when this procedure is used for the concentration of orange juice, grapefruit juice, sugar solution and coffee extract.

EXAMPLE VI

The procedure of Example V is repeated a number of times using in place of the cellulose triacetate hollow fiber, permeable hollow fibers made out of cellulose tripropionate, cellulose acetate, methyl cellulose, regenerated cellulose, casein, and polymethyl methacrylate, respectively. Satisfactory separation results are obtained in each case.

EXAMPLE VII

The procedure of Example III is repeated for the preparation of a permeability cell of the type shown in FIGURE 2. In this case the supporting core is not perforated and both ends are plugged so that there is no passageway through the core. Also, the outer shell is open at both ends, as shown in FIGURE 2, so that a channel cover can be fitted to each end of the outer shell after the fiber bundle and core are assembled therein. In this case, however, a tubesheet is formed at each end of the fiber bundle instead of the single tubesheet or flange that is formed in Example III. Moreover, in this case the tubesheets are fabricated before the fiber bundle and core are fitted into the outer shell. After the tubesheets have been formed to extend a short distance beyond the outer diameter of the fiber bundle, the tubesheets or flanges are machined on the outer lateral surface to give diameters corresponding approximately to the inner cylindrical diameter of the outer shell in the region in which they will ultimately be positioned according to that figure. Two grooves are also machined into each such lateral or annular surface of the flange for the fitting of the O rings 6. Then the outer flat surface of each flange is machined so that the fiber ends are opened at each end of the fiber bundle. Then the fiber bundle and the supporting core, together with the two flanges or tubesheets and the O rings positioned in the grooves, are inserted into the position shown in FIGURE 2, and retaining rings 14 and channel covers 7 and 13 are assembled into position.

Salt solution is fed into inlet 9 of channel cover 7 as in Example IV, except that in this case the solution is fed into fiber openings 1″ and flows through the length of the fibers that are spirally wound in the fiber bundle and out openings 1″ at the other end of the fiber bundle into the interior of channel cover 13 and out outlet 11. In this case the permeating portion of the fluid permeates from the inside of the fiber to the outside and passes downward through the spaces between the fibers and into the lower region of outer shell 5 and out permeate outlet 12. Similar excellent results are obtained in this separation as in Example IV. When other fluids such as those given in Example V are substituted for the salt solution, very good separation is also effected. Likewise, when other permeable hollow fibers such as listed in Example VI are substituted for the cellulose triacetate fiber, similar excellent results are obtained.

When utilizing a modification of the apparatus shown in FIGURE 4, it is possible to separate two components from a solution by passing the solution into contact with the outer surfaces of the fibers in the bundle. This is effected by having the winding of the fibers whose fiber ends are imbedded in the tubesheet at the left of the apparatus made of a type of permeable material which selectively permits permeation of one desired component therethrough. Accordingly, this component will be separated when passed through the selective fibers. Then by having the fiber winding whose open ends are imbedded in the tubesheet at the right of this apparatus made of a different permeable material which selectively allows another component of this solution to permeate therethrough, the second component will also be separated. Consequently one fluid having these two components in intimate contact with the two windings will thus have one component permeate into the fibers having outlets to the left of the apparatus and the other component will permeate the other fiber windings and be delivered to the outlets at the right side of the apparatus.

In such cases provision will be made for flow of the fluid directly into the chamber in which the bundle is located instead of through the fiber openings as presently shown. This can be done by having opening 12 serve as the inlet and having an overflow or outlet opening at the top of this chamber, or any other suitable arrangement that will effect such flow. In such case the lower inlet 12 can advantageously be near one flange so as to avoid channeling and insure fluid contact with the entire fiber bundle.

As indicated herein, the feed fluid can be passed through the interior of the fibers or on the outside of the fibers. However, for a number of reasons, it is generally preferable to have the feed fluid on the outside of the fiber and thereby have the permeate pass into the inside of the fiber.

The sealing between the tubesheet and the inner adjacent surface of the outer shell can be effected by any convenient means. For example, as shown in a number of the drawings, O-rings can be used for this purpose, in which case grooves are machined or otherwise formed in the outer annular surface of the tubesheet for the positioning of such rings. Other appropriate rings, gaskets, etc. can also be used. Another manner of effecting the sealing is to impregnate the fiber ends or fiber loops for the formation of the tubesheet after the outer shell is positioned over the fiber bundle and supporting core. In this way the tubesheet can be cast and cured in a manner that simultaneously effects a sealing arrangement with the outer shell.

Also, as previously indicated, the tubesheet can be formed simultaneously with the winding operation by the application of resin in the desired area, or it can be formed by the impregnation of the end of the winding after the winding is completed, either with or without the outer shell in position.

Epoxy resins are found particularly suitable for forming the tubesheet. However, any casting resin which does not adversely affect the fibers and which gives the desired adhesion and strength characteristics can be used for this purpose. The typical examples of other suitable resins are: phenol-aldehyde resins, melamine-aldehyde resins, thermosetting artificial rubbers, acrylic resins, etc. In addition to having the resin and the solvent in which it is applied inert to the fiber material, it is necessary that the resin solution have sufficient fluidity to penetrate between the fibers so as to fill the space completely, have proper adhesion thereto and provide a fluid-tight seal at the particular pressures and temperatures to which the ultimate product is to be submitted.

Epoxy resins are particularly suited for this purpose because of their inertness to solvents and to chemical corrosion, their setting characteristics and their ability to effect fluid-tight seals under the conditions to which the permeability cell is to be exposed.

Particularly suitable epoxy resins are those derived from the diglycidyl ether of bisphenol together with appropriate modifiers and curing agents. However, other epoxy resins can also be used such as the diglycidyl ethers of resorcinol, dihydroxy diphenyl, hydroquinone, etc. These can be modified by the addition of modifying resins, preferably amine resins, and appropriate curing agents and solvents. Certain materials can be used to serve both as a solvent and also to participate in the curing reaction such as liquid amines.

A particularly suitable casting formulation comprises about 14.7 parts of the diglycidyl ether of bisphenol, about 1.1 part of dimethylamino propylamine, and about 6.8 parts of soya-1,3-propylene-diamine as the curing agent. Where it is desirable to apply a primer to the metal surfaces to which the casting resin is to adhere, a very suitable composition consists of about 10 parts of diglycidyl ether of bisphenol, about 2.7 parts of N-(2-phenyl-2-hydroxyethyl)-diethylene triamine and about 7.3 parts of acetone.

The supporting core can be of any appropriate material which will resist the conditions to which it is to be exposed during the formation and use of the permeability cell. Preferably, the core is of a metal which has no adverse effect on the fiber material and is inert to the fluid which is to be treated.

In the various modifications of this invention wherein the hollow fibers are wound on a supporting core, the question of whether the core is perforated or not depends on the type of flow and other conditions in which the fiber bundle is to be used. The size and positioning of perforations in this core will be determined according to the particular flow conditions desired.

While reference has been made to "perforated" cores, it is also possible to use in the practice of this invention cores made of metal or plastic screen, porous ceramic, fritted glass, fritted metal, etc. It is only necessary where a core of a porous nature is desired, that the core be of sufficient strength to give support to the fibers and to permit flow of the fluid therethrough without disintegration of the core material or reaction with the fluid passing therethrough.

Furthermore, in place of the cylindrical core, cores having other transverse cross-sectional configurations can also be used such as hexagonal, octagonal, elliptical, etc. In some cases it may even be desirable to use a core having a slight taper so as to have the shape of a truncated cone. This shape can be used to compensate for fiber shrinkage by winding the fibers on a portion of the cone having a greater diameter, and, upon shrinkage, the fiber bundle is allowed to slide to a section having a smaller diameter.

The size of the core is determined by economic considerations and the ease in handling and manufacturing the core and the permeability cell made therewith. A particularly suitable size is a core about 12" long, approximately 3¾ inches inside diameter and 4¼ inches outside diameter, although cores as small as ½ inch outside diameter can be used. The thickness of the winding is dictated primarily by the ease in handling and assembling the permeability cell, and the ability to maintain appropriate flow rates through the bundle. Generally, a thickness of from 0.5 to 10 inches from the inner diameter of the winding to the outer diameter of the winding is advantageous, preferably a thickness of about 4–8 inches is employed.

There are numerous possible variations in the arrangement of a plurality of cells either in series or parallel arrangements or combinations thereof depending on the particular material being treated, the efficiency or degree of separation desired, the volume of fluid to be treated, etc.

The pressures to be applied to the cells or the pressure differential to be used for diffusion or permeation is determine daccording to the type of fiber material used, the type of fluid or components thereof, permeation rate, osmotic pressure and rate, etc. Generally, however, pressures in the range of from about 10 p.s.i. to about 15,000 p.s.i. are advantageously used.

Various materials can be used for making the permeable continuous hollow fibers suitable for the practice of this invention. Most of these are organic materials, for example polymeric materials such as the acetate, triacetate, propionate, nitrate, etc. esters of cellulose, including the mono-, di-, and tri-esters and mixtures of such esters; cellulose ethers, such as methyl, ethyl, hydroxy-alkyl, carboxy-alkyl, etc. including mixed cellulose ethers; regenerated cellulose; polyvinyl alcohols; polysaccharides; casein and its derivatives; etc. The aforementioned are hydrophilic in character and are more advantageous in the treatment of aqueous fluid compositions.

However, for separation of organic components from fluid mixtures, various hydrophobic materials are particularly suitable, such as: synthetic linear polyamides, polycarbonates, polyvinyl chloride and its copolymers, polyvinylidene chloride and its copolymers, acrylic ester polymers, organic silicone polymers, polyurethanes, polyvinyl formals and butyrals, and mixtures thereof, methacrylate polymers, styrene polymers, polyolefins, such as polyethylene, polypropylene, etc., and other polyesters, and mixtures of the foregoing. Acrylonitrile polymers, and also certain cellulose derivatives, such as mixed etheresters, can be modified to make them either hydrophilic or hydrophobic for whichever characteristic is desired in the practice of this invention.

Any of the foregoing materials, as well as other suitable permeable, hollow fiber forming materials including glass, etc. can be utilized according to this invention for selective separation of various fluid components as described herein, and where the hollow fiber membrane is either inherently suitable or modified so as to make it suitable for ion exchange purposes, such hollow fibers can be used for ion exchange by the practice of this invention.

Methods of making continuous hollow fibers suitable for the practice of this invention are known in the art, for example see British Patent 514,638. In general, such fibers are spun by melt, dry or wet spinning techniques depending upon the particular fiber-forming materials being used. The spinnerette is selected according to the type of spinning procedure used and the particular dimensions desired in the hollow fiber. For the production of the hollow fiber, the spinnerette has a small annular opening in the orifice through which the spinning composition is extruded.

As a typical example, cellulose triacetate is spun into continuous hollow fibers by a wet spinning process in which the cellulose triacetate, together with whatever plasticizer or modifier is considered desirable to impart ultimately the permeable character, is dissolved in a suitable solvent to form a viscous spinning solution. This solution is extruded through the spinnerette into a coagulant bath. As the extruded solution comes in contact with the bath the cellulose triacetate coagulates or gells in the desired form of a continuously hollow fiber of uniform wall thickness. If the coagulant bath is appropriate for imparting permeability to the fiber material, this characteristic is imparted to the fiber directly. If the coagulant bath is not so constituted, the fiber is led into a second bath to perform this function. The hollow fiber is then washed free of solvent or reagents and then either is used directly in forming a spiral-wound assembly in accordance with the practice of this invention or is stored on a reel or bobbin or other suitable device for subsequent use.

According to this technique, extremely fine hollow fibers can be produced. The wall thickness is desirably sufficient to withstand the pressure that will be exerted in the subsequent permeability separation utilization of these fibers. Generally, a capability of withstanding pressures of 100 lbs. per sq. in. or more is desired. It is found that the small diameters of these fine hollow fibers permit the self-supporting membrane walls of the fiber to withstand considerable pressures.

It is generally preferred that the outside diameter of the hollow fibers does not exceed 350, advantageously no more than 300 microns. Preferably the outside diameters are in the range of about 10 to about 50 microns. Advantageously, a wall thickness to outside diameter ratio of from about ⅛ to ⅓ is employed in the hollow fibers. Profitably, the wall thickness of the fibers is in the range of about 1 micron to about 80 microns, preferably from about 2 to about 15 microns. Wall thicknesses below this range may result in an inability to withstand the desired pressures, whereas thicknesses above this range increase the resistance to permeation through the fiber wall. Obviously, these characteristics will vary somewhat with the particular material being used and also the particular type of separation involved.

The transfer area of a permeability cell of this invention will vary according to the various dimensions of the hollow fiber, the type of winding used on the supporting core and the length, inside diameter and outside diameter of the wound bundle. The effective fiber length of the bundle is regarded as the initial fiber length as wound minus that portion of the original length occupied by the one or two flanging tubesheets.

The permeability separatory apparatus and process of this invention can be used for the recovery or separation of components from various types of fluid mixtures or solutions. The following are typical examples of various commercial recoveries or separations which can be effected by the practice of this invention:

(1) Recovery of water from sea water or brackish water.

(2) Concentration of salts and other chemicals in the various solutions such as NaCl, KCl, KBr, $Na_2CO_3$, $Na_2SO_4$, $Na_2B_4O_7$, $Na_3PO_4$, NaBR, NaF, $CaCl_2$, NaOH, KOH, ammonium and nitrate fertilizers, uranium and other rare salts from leach liquors, $H_3PO_4$, $CuSO_4$, monosodium glutamate, sodium thiosulfate, sodium chromate, sodium chlorate, lithium carbonate, alum, aluminum sulfate, ammonium chloride, ammonium nitrate, heavy water, glycerine, lactic acid, tanning extracts, alcohol, hydrogen fluoride, glycols, etc.

(3) Ion exchange processes, including water softening, anionic softening, recovery of magnesium from sea water, etc.

(4) Separation or concentration of heat sensitive materials, such as in the concentration of natural fruit and vegetable juices, e.g., orange, grapefruit, grape, etc., concentration of sugar solutions, concentration of beverages such as milk and extracts of coffee, tea, etc., and for various medical and pharmaceutical purposes such as in artificial kidneys, treatment of sterile solutions, isolation of virus or bacteria, fractionation of blood, production of serum, the concentration of alkaloids, glucosides, hormones, vitamins, vaccines, amino acids, antisera, antiseptics, proteins, organometallic compounds, antibiotics, etc.

(5) Separation of components which normally azeotrope or boil very closely, separation of ammonia from organic amines, etc.

(6) Processing of industrial waste streams such as waste from radioactive materials, sulfite pulps, fissionable waste, cannery waste, recovery of caustic from viscose solutions, recovery of acids from metal treating processes, etc.

Another field for which the apparatus and process of this invention are particularly adapted is in the separation of components from a gas mixture. For example, hydrogen permeates polystyrene permeable fiber about 22 times as fast as nitrogen and therefore it can easily and very practically be separated from mixtures containing the two gases, for instance, from mixtures such as those produced by the disassociation of ammonia wherein the resultant gas contains about 75 percent hydrogen and 25 percent nitrogen.

Likewise, the separation of hydrogen from mixtures containing carbon dioxide can be effected very practically according to this invention by using polystyrene permeable hollow fibers. Therefore, various commercially available mixtures of this type can be used, such as those produced in the dehydrogenation of ethyl benzene for the production of styrene, in which case hydrogen can be removed by the apparatus and process of this invention and the resultant carbon dioxide-rich residue gas is recycled to the dehydrogenation process. Hydrogen can be similarly separated from other hydrogen-containing gases such as coke oven gas, gases from hydrogenation processes and from petroleum refinery operations.

Also feasible are the gas phase separation of chlorinated methanes from unreacted methane, and the separation of nitrogen from methane to make natural gas more saleable. A somewhat related separation is the recovery of oxygen from sea water, in the manner of an artificial gill, whereby sea water passed either inside or outside the hollow fiber effects a permeability separation of the oxygen which permeates the fiber wall. This invention can also be practiced in the separation of oxygen from air, of helium from natural gas, etc.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A method of forming a permeability separatory element comprising the steps of:
   (a) spirally winding at least one continuous, hollow, permeable fiber on a supporting core in such a manner that one terminus of each said hollow fiber is positioned near one linear end of said core and the length of the hollow fiber is positioned in such a manner that the path of a fluid flowing through said hollow fiber will flow from a point near one end of said core to a point near the other end of said core;
   (b) continuing the winding of said hollow fiber on said core until a plurality of such paths running from one end of said core to the other end of said core are positioned with said fiber being supported by said core and in such a manner that the points of contact between said hollow fibers represent no more than a very small proportion of the outer surface of said fibers;
   (c) impregnating with a solution of a casting resin the space between said hollow fibers in at least one region of relatively short thickness in comparison with the length of said core and extending in a direction perpendicular from the linear axis of said core, the resultant impregnated region forming a flange extending annularly from the outer surface of said core and having a sealing annular relationship therewith, the outer annular surface of said flange extending at least to the outer windings of said hollow fiber;
   (d) cutting through the center portion of each said flange in a plane perpendicular to the axis of said core and cutting through said core and said fiber windings in this same plane so as to provide fiber openings at the cut surface of said flange;
   (e) enclosing each resultant core portion together with the attached fiber winding and flange portions in an outer shell having a configuration and size in the adjacent inner region thereof conforming to the approximate size and outer annular configuration of said flange; and
   (f) providing a sealing arrangement between said flange portion and the inner adjacent surface of said shell.

2. The method of claim 1 in which said flange is positioned near only one end of said core.

3. The method of claim 1 in which such a flange is positioned near each end of said core.

4. The method of claim 1 in which said flange is prepared by the application of a resin solution in the specified region during said winding operation.

5. The method of claim 1 in which said flange is prepared by the impregnation of said region after said winding has been completed.

6. The method of claim 1 in which said flange is reinforced and extended radially by the application of convolutions of a fabric of corresponding width around the resin impregnated region of said winding and each convolution of said fabric is adhered to adjacent convolutions.

7. The method of claim 1 in which said casting resin is cured before said outer shell is positioned to enclose said core, said fiber windings and said flange.

8. The method of claim 1 in which said outer shell is positioned to enclose said core and said hollow fiber windings and said flange is formed thereafter by resin solution impregnation while said shell is in said position, and said impregnated resin solution is thereafter cured to provide said flange and also thereby provide sealing arrangement between said flange and said inner adjacent surface of said shell.

9. The method of claim 1 in which said winding of said hollow fiber is effected spirally around said core, the resultant spiral winding being reversed in direction each time said winding approaches the end of said core, thereby producing a plurality of spiral windings one superimposed on another with alternate windings being spirally wound in the same direction and intermediate spiral windings being spirally wound in the opposite direction.

10. The method of claim 9 in which one said flange is formed.

11. The method of claim 9 in which at least three said flanges are formed.

12. The method of claim 1 in which said hollow fibers extend beyond said flange in a direction away from the main portion of said core, and said hollow fibers are cut in the region extending from the outer face of said flange and thereby providing an open end of said fiber on the side of said flange opposite from the main portion of said core.

13. The method of claim 12 in which said fibers are cut by the machining of said outer flange.

14. A method of forming a permeability separatory element comprising the steps of:
   (a) spirally winding at least one continuous, hollow, permeable fiber on a supporting core in such a manner that one terminus of each said hollow fiber is positioned near one linear end of said core and the length of the hollow fiber is positioned in such a manner that the path of a fluid flowing through said hollow fiber will flow from a point near one end of said core to a point near the other end of said core;
   (b) continuing the winding of said hollow fiber on said core until a plurality of such paths running from one end of said core to the other end of said core are positioned with said fiber being supported by said core and in such a manner that the points of contact between said hollow fibers represent no more than a very small proportion of the outer surface of said fibers;
   (c) impregnating with a solution of a casting resin the space between said hollow fibers in at least one and no more than two regions, each said region being near a linear end of said core and being of relatively short thickness in comparison with the length of said core and extending in a direction perpendicular from the linear axis of said core, the resultant impregnated region forming a flange extending annularly from the outer surface of said core and having a sealing annular relationship therewith, the outer annular surface of said flange extending at least to the outer windings of said hollow fiber;
   (d) cutting said fiber windings which extend through a substantial portion of said flange and at a point on the opposite side of said flange from the major portion of said winding so as to provide open ends of said fibers on said opposite side of said flange;
   (e) enclosing said core, said hollow fiber windings and said flange in an outer shell having a configuration and size in the adjacent inner region thereof conforming to the approximate size and outer annular configuration of said flange; and
   (f) providing a sealing arrangement between said flange and the inner adjacent surface of said shell.

15. The method of claim 14 in which said hollow fiber is supported by said core and said spiral winding is at an angle of at least 10° to the axis of said core.

16. The method of claim 14 in which said winding of said hollow fiber is effected spirally around said core, the resultant spiral winding being reversed in direction each time said winding approaches the end of said core, thereby producing a plurality of spiral windings one superimposed on another with alternate windings being spirally wound in the same direction and intermediate spiral windings being spirally wound in the opposite direction.

17. The method of claim 16 in which said hollow fiber consists of one continuous hollow fiber.

18. The method of claim 16 in which said hollow fiber comprises at least two continuous hollow fibers.

19. The method of forming a permeability separatory element comprising the steps of:
(a) winding at least one continuous, hollow, permeable fiber on a supporting core, said winding following a spiral path around said core and as the spiral winding approaches the linear end of said core, reversing the direction of said winding toward the opposite linear end of said core;
(b) continuing the spiral winding of said hollow fiber on said core until a plurality of layers of said windings have been effected, the spiral direction of successive layers of windings of said fiber being in a reversed spiral direction from each adjacent winding;
(c) impregnating with a solution of a casting resin the space between said hollow fibers in at least one and no more than two regions, each said region being near a linear end of said core and being of relatively short thickness in comparison with the length of said core and extending in a direction perpendicular from the linear axis of said core, the resultant impregnated region forming a flange extending annularly from the outer surface of said core and having a sealing annular relationship therewith, the outer annular surface of said flange extending at least to the outer winding of said hollow fiber;
(d) cutting through at least one said flange in a plane perpendicular to the axis of said core and cutting through said core and said fiber windings in this said plane so as to provide fiber openings at the cut surface of said plane;
(e) enclosing said core, said hollow fiber windings and said flange in an outer shell having a configuration and size in the adjacent inner region thereof conforming to the approximate size and outer annular configuration of said flange; and
(f) providing a sealing arrangement between said flange and the adjacent inner surface of said shell.

20. The method of claim 19 in which one such flange is formed.

21. The method of claim 19 in which two such flanges are formed.

22. The method of claim 19 in which said impregnated resin is cured before said outer shell is positioned.

23. The method of claim 19 in which said outer shell is positioned around said windings and said core before said resin solution impregnation and said impregnation is effected and said resin cured while said shell is so positioned thereby effecting said sealing arrangement between said resultant flange and said adjacent inner surface of said shell.

24. A separatory element comprising:
(a) a supporting core;
(b) at least one continuous hollow, permeable, organic fiber having one terminus of said hollow fiber positioned near one linear end of said core and said hollow fiber being supported by said core and positioned in relationship thereto so that the path of a liquid flowing through said hollow fiber will flow spirally from the point near one end of said core to a point near the other end of said core;
(c) a rigid, resinous flange extending radially from said core and near said one linear end of said core, said hollow fiber passing through said flange and the outer surface of that portion of said fiber which passes through said flange being in a fluid-tight sealing arrangement with said flange;
(d) an outer shell having a configuration and size in the adjacent inner region thereof conforming to the approximate size and outer configuration of said flange, said outer shell enclosing and supporting core and said fibers positioned thereon and having means for permitting the flow of fluid therethrough; and
(e) a means for providing a sealing arrangement between said flange and the inner adjacent surface of said shell.

25. The separatory element of claim 24 in which said hollow fiber has an outside diameter of not more than about 350 microns.

26. The separatory element of claim 24 in which said hollow fiber has an outside diameter of from about 10 to about 50 microns.

27. The separatory element of claim 24 in which said hollow fiber has a wall thickness of from about 1 to about 50 microns.

28. The separatory element of claim 24 in which:
said core is a hollow porous cylindrical core closed at the end adjacent to said flange, and has a plurality of pores spaced from each other and distributed over a substantial portion of the cylindrical portion thereof;
said outer shell has a channel cover fastened to and forming a fluid sealing relationship therewith in a region located near said flange and communicating with the open end of said fiber extending through said flange, said channel cover having a fluid outlet communicating with that portion of said channel cover which is in communication with the open end of said fiber and adapted to permit the flow of fluid from said fiber and out of said channel cover through said outlet;
said core having a fluid inlet means adapted to conduct fluid to the inner region thereof near said end of said core opposite from said flange;
said outer shell having a fluid outlet at a point remote from that end of said core near which said fluid inlet is adapted to flow fluid into the inner region of said core;
said element being adapted to have fluid flow into said interior region of said core, through the pores in said core, into contact with and partially permeating into said fibers, and then the non-permeating portion of said fluid flowing out through said outer shell fluid outlet, the fluid component which permeates to the inner region of said hollow fiber flowing into the interior region of said channel cover and out through said fluid outlet in said channel cover.

29. The separatory element of claim 24 in which said element also comprises a second rigid resinous flange adjacent to the other linear end of said core, extending radially therefrom, in fluid sealing arrangement therewith, and having encased therein a portion of said fiber, said second flange also being in a fluid-tight sealing arrangement with said outer shell.

30. The separatory element of claim 29 in which said portion of said fiber encased in said second flange is a looped portion of said fiber.

31. The separatory element of claim 29 in which said portion of said fiber encased in said second flange is a second terminus of said fiber and said fiber extends entirely through said flange.

32. The separatory element of claim 24 in which said hollow fiber has an outside diameter of less than 350 microns and a wall thickness to outside diameter ratio of from about 1/8 to about 1/3.

33. The separatory element of claim 32 in which said fiber is cellulose triacetate.

34. The separatory element of claim 33 in which said flange comprises a cured epoxy resin.

35. The separatory element of claim 24 in which said fiber is cellulose triacetate.

36. The separatory element of claim 35 in which said flange comprises a cured epoxy resin.

37. The separatory element of claim 24 in which:
said core is a hollow porous cylindrical core closed at the end opposite from that adjacent to said flange, and has a plurality of pores spaced from each other and distributed over a substantial portion of the cylindrical portion thereof;
said outer shell has a channel cover fastened to and forming a fluid sealing relationship therewith in a region located near said flange and communicating with the open end of said fiber extending through said flange, said channel cover having a fluid outlet communicating with that portion of said channel cover which is in communication with the open end of said fiber and adapted to permit the flow of fluid from said fiber and out of said channel cover through said outlet;
said core having a fluid inlet means adapted to conduct fluid to the inner region thereof near one end of said core;
said outer shell having a fluid outlet at a point remote from that end of said core near which said fluid inlet is adapted to flow fluid into the inner region of said core;
said element being adapted to have fluid flow into said interior region of said core, through the pores in said core, into contact with and partially permeating into said fibers, and then the non-permeating portion of said fluid flowing out through said outer shell fluid outlet, the fluid component which permeates to the inner region of said hollow fiber flowing into the interior region of said channel cover and out through said fluid outlet in said channel cover.

38. The separatory element of claim 37 in which said hollow fibers have an outside diameter of less than about 350 microns and a wall thickness to outside diameter ratio of from about ⅛ to about ⅓, said fiber is cellulose triacetate, and said flange comprises a cured epoxy resin.

39. The separatory element of claim 24 in which:
said supporting core is a cylindrical core closed at both ends;
said outer shell has a channel cover fastened to and forming a fluid sealing relationship at each end of said outer shell;
said core has a second rigid, resinous flange extending radially therefrom and near the other linear end of said core;
said hollow fiber passing through said second flange and the outer surface of that portion of said fibers which passes through said flange being in a fluid-tight sealing arrangement with said flange;
said outer shell having a configuration and size also in the adjacent inner region thereof conforming to the approximate size and outer configuration of said second flange;
said element also includes a means for providing a sealing arrangement between said second flange and the inner adjacent surface of said shell;
said shell having an outlet means for the flow of fluid positioned intermediate between said flanges and in fluid-tight sealing arrangement with said shell;
each end of said outer shell has a channel cover attached thereto in fluid-tight sealing arrangement, each said channel cover having an opening therein leading to the interior of said channel;
said separatory element being adapted to flow fluid into one of said channel covers, then into the open end of said fiber extending through one of said flanges, thereafter through the length of said fiber, said fluid which does not permeate said fiber walls flowing through the length of said fiber through the opposite end of said fiber imbedded in the other flange and out through the open end of said fiber into the inner region of said second channel cover and out the opening therein;
said outer shell being adapted in its inner region to receive fluid which permeates through the walls of said permeable hollow fiber and to have such permeate flow out through the outlet in said outer shell.

40. The separatory element of claim 39 in which said hollow fibers have an outside diameter of less than about 350 microns and a wall thickness to outside diameter ratio of from about ⅛ to about ⅓, said fiber is cellulose triacetate, and each said flange comprises a cured epoxy resin.

41. The separatory element of claim 24 in which:
said continuous hollow fiber has both ends thereof imbedded in and extending through said flange;
said core has at least one other continuous hollow, permeable fiber positioned in relationship thereto so that the path of a liquid flowing through said second hollow fiber will flow from a point near the opposite end of said core towards said first flange, through a portion of said fiber imbedded in said first flange and then in a direction returning to said opposite end of said core;
said second hollow fiber has both ends thereof imbedded in and extending through a second rigid, resinous flange extending radially from said core and near said other linear end of said core, said second hollow fiber passing through said second flange and the outer surface of that portion of said fiber which passes through said second flange being in a fluid-tight sealing arrangement with said second flange;
said outer shell having both ends thereof open and adapted to receive in its interior region both of said flanges, said outer shell also having a configuration and size in the adjacent inner region thereof conforming to the approximate size and outer configuration of said second flange;
said element includes a means for providing a sealing arrangement between said second flange and the inner adjacent surface of said shell;
said outer shell having affixed at one end thereof in fluid-tight sealing arrangement, a first channel cover and at the other end thereof a second channel cover in fluid-tight sealing arrangement;
each said channel cover having two separate compartments therein, one compartment having an inlet opening and the other compartment having an outlet opening, said compartments in the same channel cover being non-communicating with each other except through said hollow fiber, said hollow fiber having one end thereof in communication with one of said compartments in one of said channel covers and the other end of said fiber being in communication with the other compartment in that same channel cover;
said element being adapted to have fluid flow into the inlet opening of one of said compartments in said first channel cover, then into said fiber end communicating with said compartment, then through said hollow fiber to the opposite end of said fiber bundle, then through the looped section of said fiber imbedded in said second flange and then in a direction toward said first channel cover and out through the other end of said hollow fiber into the other compartment of said first channel cover and then out the outlet end of said other compartment;
fluid passing into said inlet of one of the compartments of said second channel cover entering an open end of the hollow fiber in communication with said compartment passing in a direction away from said compartment with respect to said supporting core to and through a looped section of said fiber imbedded in said first flange and then returning toward said second channel cover and through the other end of said fiber into the other compartment of said second channel cover and out through the outlet of said opposite compartment;

said outer shell being adapted to receive permeate in its interior region and to flow said permeate through the outlet thereof.

42. The separatory element of claim 41 in which said hollow fibers have an outside diameter of less than about 350 microns and a wall thickness to outside diameter ratio of from about ⅛ to about ⅓, said fiber is cellulose triacetate, and each said flange comprises a cured epoxy resin.

43. A method for the separation of a component from a fluid having at least one other component therein comprising the steps of:

flowing said fluid through a plurality of continuous hollow, permeable fibers having one terminus of each of said hollow fibers positioned near one linear end of a core on which said fibers are spirally wound and supported each alternate spiral winding of said fibers being in a reverse direction of the intermediate spiral windings;

collecting that portion of component of said fluid which permeates the wall of said fibers and conducting it away from said fiber; and flowing the non-permeated portion of said fluid through the length of said fibers and out the opposite end thereof.

44. The method of claim 43 in which said hollow fiber has an outside diameter of less than about 350 microns and a wall thickness to outside diameter ratio of from about ⅛ to about ⅓.

45. The method of claim 43 in which said fiber is cellulose triacetate.

46. The method of claim 43 in which said fluid flowing through said hollow fiber is fed at a pressure of at least 10 pounds per sq. in.

47. The method of claim 46 in which said hollow fiber has an outside diameter of less than about 350 microns and a wall thickness to outside diameter ratio of from about ⅛ to about ⅓.

48. The method of claim 46 in which said fluid is flowed through a plurality of said hollow fibers.

49. The method of claim 48 in which said fiber is cellulose triacetate.

50. A method for the separation of a component from a fluid having at least one other component therein comprising the steps of:

flowing said fluid on the outside of a plurality of continuous hollow permeable fibers having one terminus of each of said hollow fiber positioned near one linear end of a core on which said fibers is spirally wound and supported;

collecting that portion of component of said fluid which permeates the walls of said fibers and conducting it away from the interior of said fibers; and flowing the non-permeated portion of said fluid away from said fibers.

51. The method of claim 50 in which said hollow fiber has an outside diameter of less than about 350 microns and a wall thickness to outside diameter ratio of from about ⅛ to about ⅓.

52. The method of claim 50 in which said fiber is cellulose triacetate.

53. The method of claim 50 in which said fluid is fed into contact with said fiber at a pressure of at least 10 pounds per sq. in.

54. The method of claim 53 in which said hollow fiber has an outside diameter of less than about 350 microns and a wall thickness to outside diameter ratio of from about ⅛ to about ⅓.

55. The method of claim 53 in which said fiber is cellulose triacetate.

References Cited

UNITED STATES PATENTS

| | | | |
|---|---|---|---|
| Re. 24,822 | 5/1960 | Pallotta et al. | 210—321 |
| 3,072,513 | 1/1963 | Schlarb | 156—174 X |
| 3,123,446 | 3/1964 | Wheeler | 29—183 |
| 3,228,876 | 1/1966 | Mahon | 210—22 |
| 3,228,877 | 1/1966 | Mahon | 210—22 |
| 2,671,336 | 3/1954 | Hulsberg | 55—158 X |
| 2,715,097 | 8/1955 | Guarino | 210—321 |
| 2,864,506 | 12/1958 | Hiskey | 210—321 |
| 2,911,057 | 11/1959 | Green et al. | 55—16 |
| 3,198,335 | 8/1965 | Lewis et al. | 55—158 X |
| 3,262,251 | 7/1966 | Hicks | 55—158 |
| 3,289,846 | 12/1966 | Warrington et al. | 210—321 X |
| 3,333,583 | 8/1967 | Budell | 210—321 X |

REUBEN FRIEDMAN, *Primary Examiner.*

F. A. SPEAR, JR., *Assistant Examiner.*

U.S. Cl. X.R.

210—23, 321, 497.1; 29—163.5; 55—16, 158